Patented Aug. 8, 1950

2,518,144

UNITED STATES PATENT OFFICE 2,518,144

MANUFACTURE OF COMPOSITE PRODUCTS OF RUBBER AND RAYON AND THE PRODUCTS OBTAINED THEREBY

James William Illingworth, Little Aston, Sutton Coldfield, England, assignor to Dunlop Tire & Rubber Corporation, Buffalo, N. Y., a corporation of New York No Drawing. Application April 27, 1945, Serial No. 590,733. In Great Britain June 15, 1944

9 Claims. (Cl. 154—136)

My invention relates to the manufacture of composite products of rubber and rayon. It is particularly concerned with the manufacture of pneumatic tyre covers having a structure which comprises plies of rubberised rayon cord, and with other products of the rubber industry comprising strata of rubber and rayon such as belting and hose.

There has been described a method of improving the bond between rubber and artificial silk, for instance cords or twisted filaments of artificial silk, which comprises treating said artificial silk with an aqueous protein-latex composition, drying said treated artificial silk, associating therewith a vulcanisable rubber composition, and thereafter vulcanising. According to this prior proposal a protein-latex composition suitable for employment in the method contains 5.0 parts of casein, 12.5 parts of rubber, 3.0 parts of ammonium hydroxide and 79.5 parts of water.

It is an object of the present invention to provide a process for the manufacture of composite products of rubber and rayon whereby the operations of applying an aqueous composition to the rayon and drying the said composition before application of the vulcanisable rubber to the treated rayon are avoided.

I have found that a strong bond between rubber and rayon is obtained by the employment of a rayon containing casein.

I accordingly provide a process for the manufacture of composite products of rubber and rayon comprising applying a vulcanisable rubber composition to an assemblage of yarns formed from viscose containing casein and vulcanising the structure so formed by heating.

I also provide a process for improving the adhesion between assemblages of rayon yarns and rubber compositions in composite products of rubber and rayon which includes the step of incorporating casein into the viscose from which the rayon yarns are formed.

Said casein preferably does not exceed 2% by weight of the viscose.

Yarns of regenerated cellulose containing casein may be obtained from a mixture of viscose and casein in a manner similar to that adopted for the production of viscose rayon yarn, the mixture being extruded through a plurality of apertures into a precipitating bath of acid coagulant and the resulting filaments being assembled into a thread.

A rayon cord employed in the manufacture of pneumatic tyre covers in accordance with the invention may be made by spinning ripened viscose, which contains an amount of casein equivalent to 1% of the cellulose content of the viscose, to thread comprising 500 filaments of 1100 denier with a twist of about 3.5 turns per inch, increasing the twist of the thread to about 17 turns per inch, and combining two such threads to a cord by twisting them together with about 11.5 turns per inch in the opposite direction.

Note that I use very small quantities of the casein as such are ideal for the purpose of the present invention providing the required adhesion and avoiding the disadvantages of greater amounts.

The yarn employed in the process of the invention may be doubled, cabled or woven to fabric before application of the vulcanisable rubber composition thereto. In the production of the so-called "weftless cord fabric" from which are cut the "fabric plies" employed in tyre cover fabrication, a plurality of cords in parallel arrangement is coated with a vulcanisable rubber composition by the agency of a calender.

The rubber ingredient of the vulcanisable rubber composition employed may be a natural rubber or the like, a so-called synthetic rubber or the like, for example, a copolymer of butadiene and styrene, a reclaimed rubber or the like, or a mixture of these materials.

Having described my invention, what I claim is:

1. Process for the manufacture of composite products of rubber and rayon comprising applying a vulcanisable rubber composition to an assemblage of yarns formed from viscose containing casein and vulcanising the structure so formed by heating.

2. Process of improving the adhesion between assemblages of rayon yarns and rubber compositions in composite products of rubber and rayon which includes the step of incorporating casein into the viscose from which the rayon yarns are formed, spinning said viscose to filaments, applying a vulcanisable rubber composition to said filaments and vulcanising the structure so formed.

3. Process of claim 1 wherein said casein does not exceed 2% by weight of the viscose.

4. Process for the manufacture of composite products of rubber and rayon which comprises forming filaments of viscose containing about 2% of casein, incorporating said filaments in a vulcanizable rubber composition and vulcanising.

5. A composite product comprising a vulcanised rubber composition and filaments of regenerated cellulose containing about 2% of casein, embedded in rubber composition.

6. A composite product comprising a vulcanised rubber composition and filaments of rayon embedded therein, said rayon containing between 1% and 2% of casein.

7. A composite product which comprises a cord of filaments of rayon containing between 1% and 2% of casein and a vulcanised rubber composition in which said cords are embedded.

8. A process for the manufacture of composite products of rubber and rayon which comprises forming filaments of a composition of rayon containing between 1% and 2% of casein, incorporating said filaments in a vulcanisable composition and vulcanising.

9. A composite article comprising vulcanized rubber bonded to viscose rayon cords each filament of which has casein distributed uniformly throughout it, the proportion of said casein in the filaments being not more than 2 per cent by weight based on the dry weight of the viscose rayon.

JAMES WILLIAM ILLINGWORTH.

REFERENCES CITED

The following references are of record in the file of this patent:

UNITED STATES PATENTS

| Number | Name | Date |
|---|---|---|
| 1,622,368 | Chavassieu | Mar. 29, 1927 |
| 2,057,323 | Borzykowski | Oct. 13, 1936 |
| 2,080,002 | Bitter | May 11, 1937 |
| 2,098,037 | Hazell | Nov. 2, 1937 |
| 2,129,623 | Nicol | Sept. 6, 1938 |
| 2,188,283 | Manchester | Jan. 23, 1940 |

OTHER REFERENCES

Latex and Rubber Derivatives, Marchionna, vol. II, page 443, 444, published by the Rubber Age, 1937, New York.